United States Patent [19]

Takahashi et al.

[11] Patent Number: 5,132,812
[45] Date of Patent: Jul. 21, 1992

[54] METHOD OF MANUFACTURING DISPLAY HAVING DIFFRACTION GRATING PATTERNS

[75] Inventors: Susumu Takahashi, Matsudo; Toshiki Toda, Satte; Fujio Iwata, Chiba, all of Japan

[73] Assignee: Toppan Printing Co., Ltd., Tokyo, Japan

[21] Appl. No.: 597,229

[22] Filed: Oct. 15, 1990

[30] Foreign Application Priority Data

Oct. 16, 1989 [JP] Japan ................... 1-268780

[51] Int. Cl.⁵ .............................. G03H 1/08
[52] U.S. Cl. ........................ 359/9; 359/569; 359/900
[58] Field of Search .......... 350/3.66, 162.11, 162.17, 350/162.18, 162.2, 320; 250/492.3

[56] References Cited

U.S. PATENT DOCUMENTS

| | | | |
|---|---|---|---|
| 3,646,335 | 2/1972 | Cindrich | 350/3.66 |
| 4,498,740 | 2/1985 | Caulfield | 350/3.66 |
| 4,778,262 | 10/1988 | Haines | 350/3.66 |
| 4,846,552 | 7/1989 | Veldkamp et al. | 250/492.1 |
| 4,896,044 | 1/1990 | Li et al. | 250/492.3 |
| 4,929,823 | 5/1990 | Kato et al. | 250/201.5 |
| 5,016,953 | 5/1991 | Moss et al. | 350/3.66 |

*Primary Examiner*—Bruce Y. Arnold
*Assistant Examiner*—J. P. Ryan
*Attorney, Agent, or Firm*—Armstrong, Nikaido, Marmelstein, Kubovcik and Murray

[57] ABSTRACT

A method of manufacturing a display having diffraction grating patterns, includes the steps of (a) obtaining a plurality of two-dimensional images by observing an object at a plurality of positions, and inputting images of the plurality of two-dimensional images in a computer, (b) selecting nth image data from the plurality of image data, (c) inputting data of a reproducing light source position and a view direction, (d) inputting predetermined dot data of the nth image data, (e) determining a pitch and a direction of a grating and an area of a dot on the basis of the data of the reproducing light source position and the view direction and the dot data, (f) moving an X-Y stage to a predetermined position on the basis of the dot data and delineating the diffraction grating by using an electron scanning unit, (g) sequentially incrementing an address of the dot data and repeating the steps (d) to (f) until all data corresponding to the nth image data are processed, and (h) selecting another image data, and repeating the steps (b) to (g) until all image data are processed.

2 Claims, 8 Drawing Sheets

METHOD OF MANUFACTURING DISPLAY HAVING DIFFRACTION GRATING PATTERNS

BACKGROUND OF THE INVENTION

1. Field of the Invention

The present invention relates to a method of manufacturing a display which is formed by arranging small diffraction gratings on a two-dimensional plane in units of dots.

2. Description of the Related Art

Displays having diffraction grating patterns have been widely used. Such a diffraction grating pattern is formed by arranging a plurality of small dots consisting of diffraction gratings on a surface of a flat board. For example, Published Unexamined Japanese Patent Application No. 60-156004 discloses a method of manufacturing a display having a diffraction grating pattern of this type. In this method, small interference fringes (to be described as diffraction gratings hereinafter) produced by interference of two laser beams are sequentially exposed on a photosensitive film while the pitch and direction of the diffraction gratings and the light intensity are changed.

Recently, the present inventor has proposed a method of manufacturing a display on which a diffraction grating pattern having a certain graphic pattern is formed. In this method, an X-Y stage on which a flat board is placed is moved under the control of a computer so as to arrange a plurality of small dots consisting of diffraction gratings on a surface of the board. This method is disclosed in U.S. Ser. No. 276,469 on Nov. 25, 1988, now U.S. Pat. No. 5,058,092.

In such a method of manufacturing a display, however, an image input by an image scanner or the like, a two-dimensional image formed by computer graphics, or the like is used as a graphic pattern for a display having a diffraction grating pattern. Since a graphic pattern expressed by a diffraction grating pattern is positioned on a plane of a board on which diffraction gratings are arranged, only a two-dimensional graphic pattern can be expressed, but a panorama parallax or three-dimensional graphic image cannot be expressed.

SUMMARY OF THE INVENTION

It is the first object of the present invention to provide a method of manufacturing a display having diffraction grating patterns with parallax.

It is the second object of the present invention to provide a method of manufacturing a display having diffraction grating patterns, which allows observation of a panorama parallax image.

In order to achieve the above objects, according to the present invention, there is provided a method of manufacturing a display having diffraction grating patterns, comprising the steps of:

(a) obtaining a plurality of two-dimensional images by observing an object at a plurality of positions, and inputting images of the plurality of two-dimensional images to a computer;

(b) selecting nth image data from the plurality of image data;

(c) inputting data of a reproducing light source position and a view direction;

(d) inputting predetermined dot data of the nth image data;

(e) determining a pitch and a direction of a diffraction grating and an area of a dot on the basis of the data of the reproducing light source position and the view direction and the dot data;

(f) moving an X-Y stage to a predetermined position on the basis of the dot data and delineating the diffraction grating by using an electron scanning unit;

(g) sequentially incrementing an address of the dot and repeating the steps (d) to (f) until all data corresponding to the nth image data are processed; and (h) selecting another image data, and repeating the steps (b) to (g) until all image data are processed.

When the display manufactured in this manner is observed, a two-dimensional image which should be seen when observed from the right direction is observed from the right direction, and a two-dimensional image which should be seen when observed from the left direction is observed form the left direction. Therefore, the observer views an image with parallax with respect to the right and left directions and hence can observe a panorama parallax image.

According to the manufacturing method of the present invention, a display with parallax can be manufactured by delineating two-dimensional images, which are obtained by observing a panorama parallax object from a plurality of directions, on a single board while changing the direction and pitch of a small dot-like grating. Therefore, when this display is observed, a panorama parallax image can be observed.

According to the present invention, the image can be reproduced, which is brighter and lower in noise than a panorama parallax image like a hologram, because the diffraction gratings pattern of the present invention has a null data portion and an ideal diffraction gratings as the digital data.

In order to achieve the above objects, according to the present invention, there is provided another method of manufacturing a display having diffraction grating patterns by using a two-beam interference method, comprising the steps of:

(a) obtaining a plurality of two-dimensional images by observing an object at a plurality of positions, and inputting images of the plurality of two-dimensional images to a computer;

(b) selecting nth image data from the plurality of image data;

(c) inputting data of a reproducing light source position and a view direction;

(d) inputting predetermined dot data of the nth image data;

(e) determining a pitch and a direction of a diffraction grating and an exposure time on the basis of the data of the reproducing light source position and the view direction and the dot data;

(f) moving an X-Y-$\theta$ stage to a predetermined position on the basis of the dot data and forming the diffraction grating by using the two-beam interference method;

(g) sequentially incrementing an address of the dot data and repeating the steps (d) to (f) until all data corresponding to the nth image data are processed; and (h) selecting another image data, and repeating the steps (b) to (g) until all image data are processed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

A method of manufacturing a display having diffraction grating patterns according to the present invention will be described below with reference to FIGS. 1 to 6. In this method, a display is manufactured by using electron beams.

Figure 1:
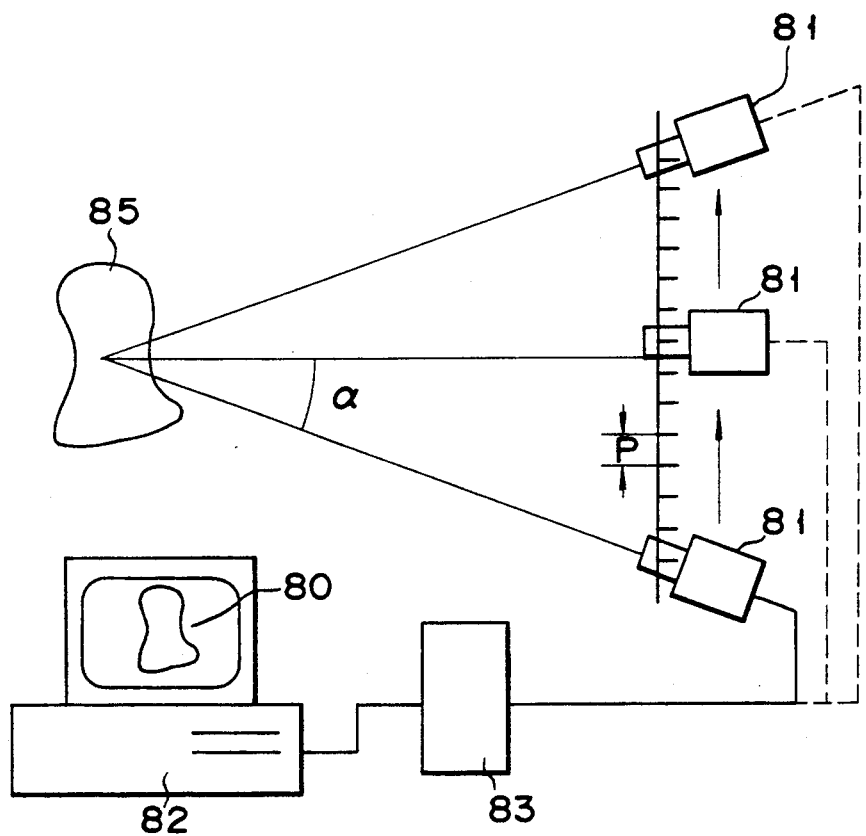
FIG. 1 is a view for explaining a method of photographing an original image according to the present invention.

A method of inputting a plurality of twodimensional images will be described first with reference to FIG. 1.

A two-dimensional image 80 of an object 85 to be three-dimensionally displayed is photographed by using a TV camera 81. More specifically, one TV camera 81 is placed at a plurality of positions defined by intervals p, and a plurality of two-dimensional images 85 of the object 85 corresponding to the respective positions are photographed. The data of these two-dimensional images 85 is input to a computer 82 by using a digitizer 83 so as to be stored as image data. In order to input the data of these two-dimensional images 85 to the computer 82, data recorded on a video tape may be used, or data of a photograph or a movie may be used. In addition, the object 85 to be three-dimensionally displayed is not limited to an existing object but may include computer graphics.

A method of determining a direction $\Omega$ and a pitch d of each diffraction grating will be described below with reference to FIGS. 2 and 3.

Figure 2:
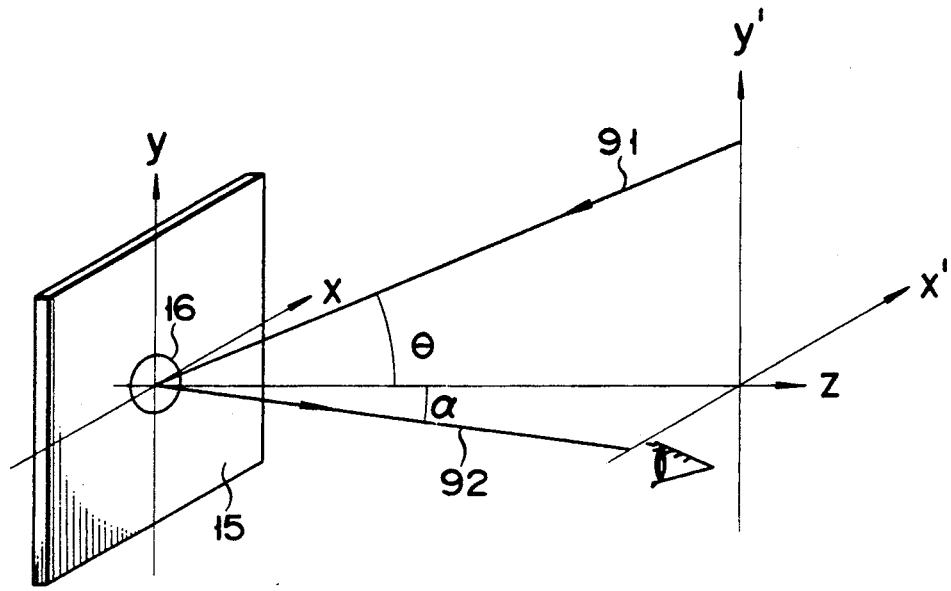
FIG. 2 is a view for explaining a method of observing a display manufactured according to the present invention.
Figure 3:
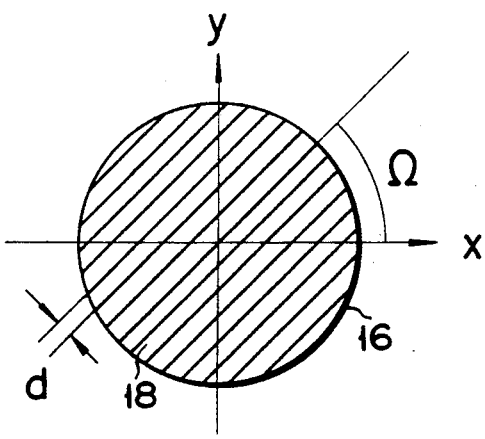
FIG. 3 is an enlarged view of a dot according to the present invention.

Assume that an observer observes a display 15 having a dot 16 which is manufactured by the method of the present invention, as shown in FIG. 2. If the incidence angle of illumination light 91 is $\theta$, the direction of 1st-order diffracted light 92 diffracted by a diffraction grating 18 is $\alpha$, and the wavelength of the 1storder diffracted light 92 is $\lambda$ as shown in FIG. 2, a direction $\Omega$ of the diffraction grating 18 and a pitch d (the reciprocal of a spatial frequency) of the diffraction grating 18 can be obtained by the following equations. Assume that the illumination light 91 propapates on the Y-Z plane, and the diffracted light propapates on the X-Z plane.

$$tan(\Omega) = sin(\alpha)/sin(\theta)$$

$$d = \lambda / \sqrt{sin^2(\theta) + sin^2(\alpha)}$$

By sing the above equations, the direction $\Omega$ and the pitch d of the diffraction grating 18 which are used to diffract the illumination light 91 in an arbitrary direction can be obtained. That is, if the incidence angle $\theta$ of the illumination light 91, and the direction and the wavelength $\lambda$ of the 1st-order diffracted light 92 are provided, the direction $\Omega$ and the pitch d of the diffraction grating 18 can be obtained.

Figure 4:
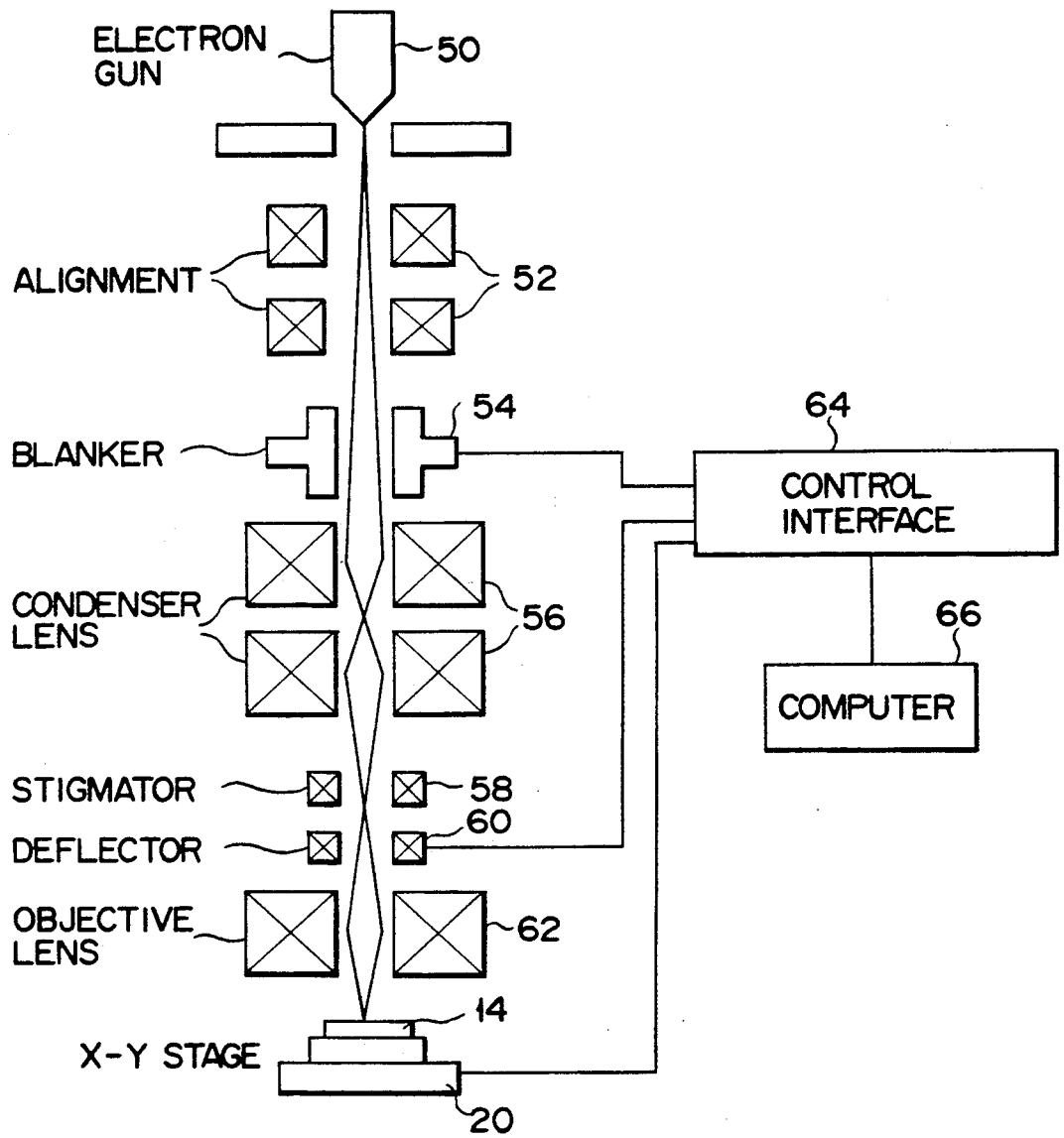
FIG. 4 is a schematic view showing an electron beam exposure unit used in a method of manufacturing a display having diffraction grating patterns according to the first embodiment of the present invention.

Delineation of a diffraction grating by means of an electron beam scanning unit will be described below with reference to FIGS. 4 and 5.

The electron beam scanning unit comprises an electron gun 50, an alignment 52, a blanker 54, a condenser lens 56, a stimator 58, a deflector 60, an objective lens 62, and an X-Y stage 20. An EB resist (dryplate) 14 is placed on the X-Y stage 20. The blanker 54, the deflector 60, and the X-Y stage 20 are connected to a computer 66 through a control interface 64. An electron beam radiated from the electron gun 50 scans the dryplate 14 under the control of the computer 66.

Figure 5:
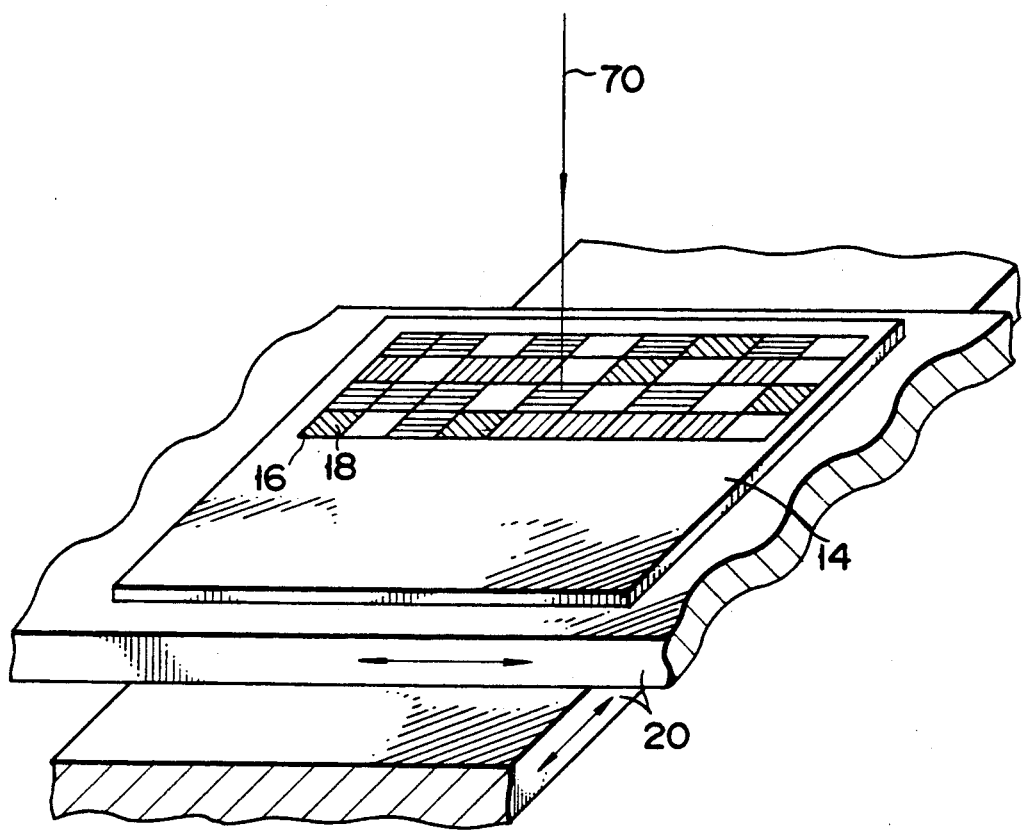
FIG. 5 is a view showing an EB resist placed on an X-Y stage.

FIG. 5 shows the dryplate 14 placed on the X-Y stage 20. An electron beam 70 emitted from the electron gun 50 is used to delineate diffraction gratings 18 in units of dots 16. The diffraction gratings 18 are sequentially delineated in units of dots by moving the X-Y stage 20.

Figure 6:
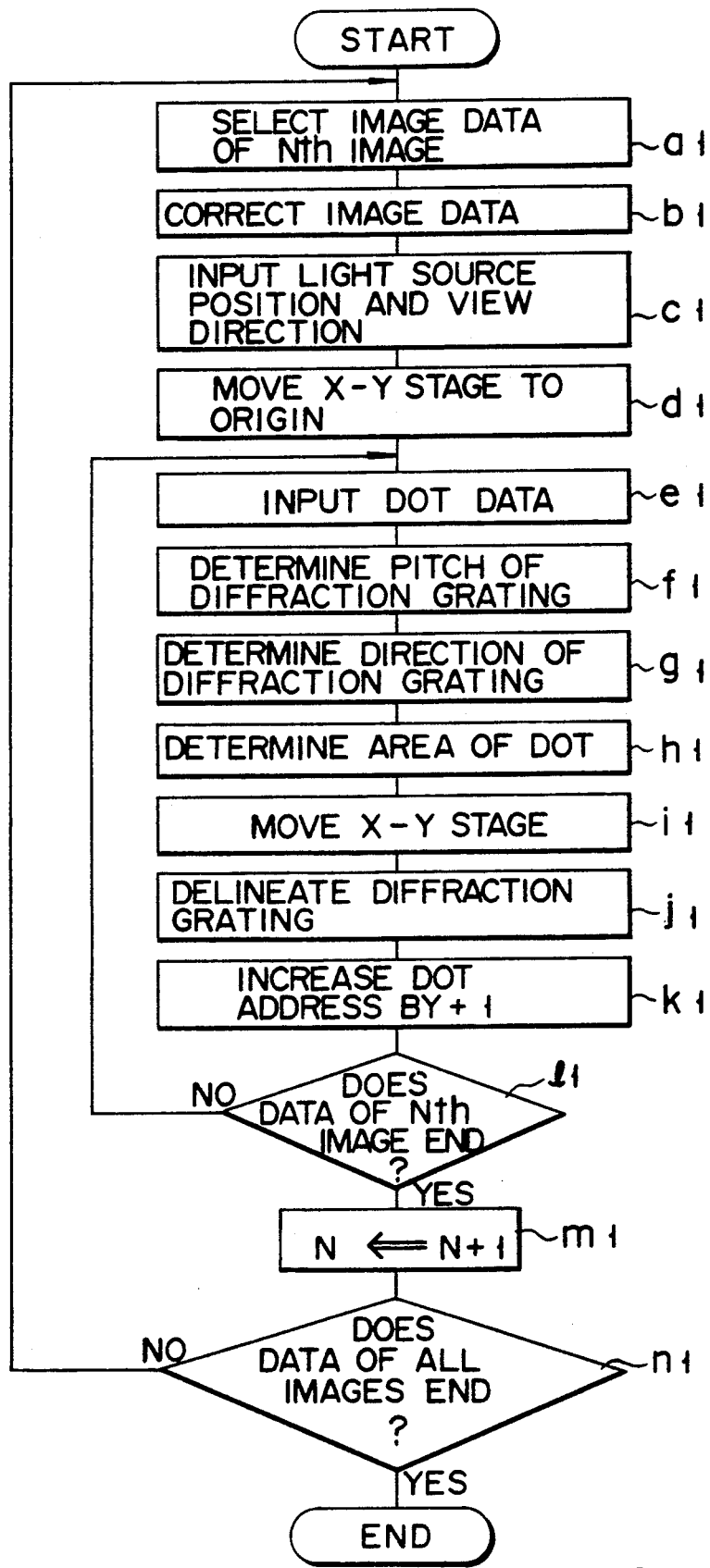
FIG. 6 is a flow chart for explaining the manufacturing method according to the first embodiment of the present invention.

A sequence of operations will be described below with reference to FIG. 6.

In step a1, an Nth two-dimensional image of an object to be three-dimensionally displayed is photographed by the TV camera, and image data of the two-dimensional image is read and input to the computer. Alternatively, image data of computer graphics may be input to the computer. In addition, after all the required two-dimensional images of an object to be three-dimensionally displayed are photographed at a plurality of photographing positions and are input to the computer, an Nth two-dimensional image may be selected from the data of the plurality of two-dimensional images.

In step b1, the two-dimensional image is corrected in the computer. This is because a two-dimensional image input to the computer often requires correction for, e.g., distortion and contrast.

In step c1, a light source position and a view direction in observation of the display of the present invention are input to the computer.

In step d1, the X-Y stage is moved to the origin. In step e1, dot data associated with the Nth two-dimensional image is input from a data file to the computer. Of the image data of the corrected two-dimensional image, this dot data is associated with the position, color (wavelength), and brightness of the above-mentioned dot, and the direction of the dot with respect to the stereoscopic object assumed when the two-dimensional image including the dot is fetched.

Subsequently, in steps f1, f2, and h1, the pitch and direction of a diffraction grating and the area of the dot are determined on the basis of these data and the light source position and the view direction input in step c1. The pitch and direction of the diffraction grating are obtained by using the above-mentioned equations. The area of the dot is set to be proportional to the brightness of a portion of the object which corresponds to the dot. Note that the order of steps f1, g1, and h1 is not limited to the above order but may be variously changed.

In step i1, the X-Y stage is moved to the position of the dot to be delineated on the basis of the dot data input in step e1. In step j1, a diffraction grating for the dot is delineated by using the above-described electron beam scanning unit. With this series of steps, delineation of the diffraction grating corresponding to one dot is completed.

Subsequently, in step k1, the address of the data file is incremented by one in order to refer to the data of the next dot. If it is determined in step l1 that image data corresponding to this address is present, the flow returns to step e1 to input the data of another dot, and steps f1, g1, h1, i1, j1, and k1 are repeated. This series of steps is continued until all the image data corresponding to the dots of the Nth two-dimensional image are processed. With this processing, delineation of a diffraction grating pattern based on the image data of the Nth two-dimensional image is completed.

If it is determined in step l1 that delineation of the Nth two-dimensional image is completed, the flow advances to step m1 to refer to an (N+1)th two-dimensional image. If it is determined in step n1 that the (N+1)th two-dimensional image is present, the flow returns to step a1, and steps a1 to l1 are executed. With this processing, diffraction grating patterns corresponding to the (N+1)th two-dimensional image are formed.

If the loop consisting of steps a1 to n1 is executed in this manner and it is determined in step n1 that no further three-dimensional image is present, delineation of all the diffraction gratings is completed.

The dryplate having the diffraction grating patterns formed in this manner is used as a master plate for duplication. Duplication is performed by a well known embossing method.

The second embodiment of the present invention will be described below with reference to FIGS. 7 to 10. This embodiment is a method of manufacturing dots of diffraction gratings by interference of two laser beams.

Figure 7:
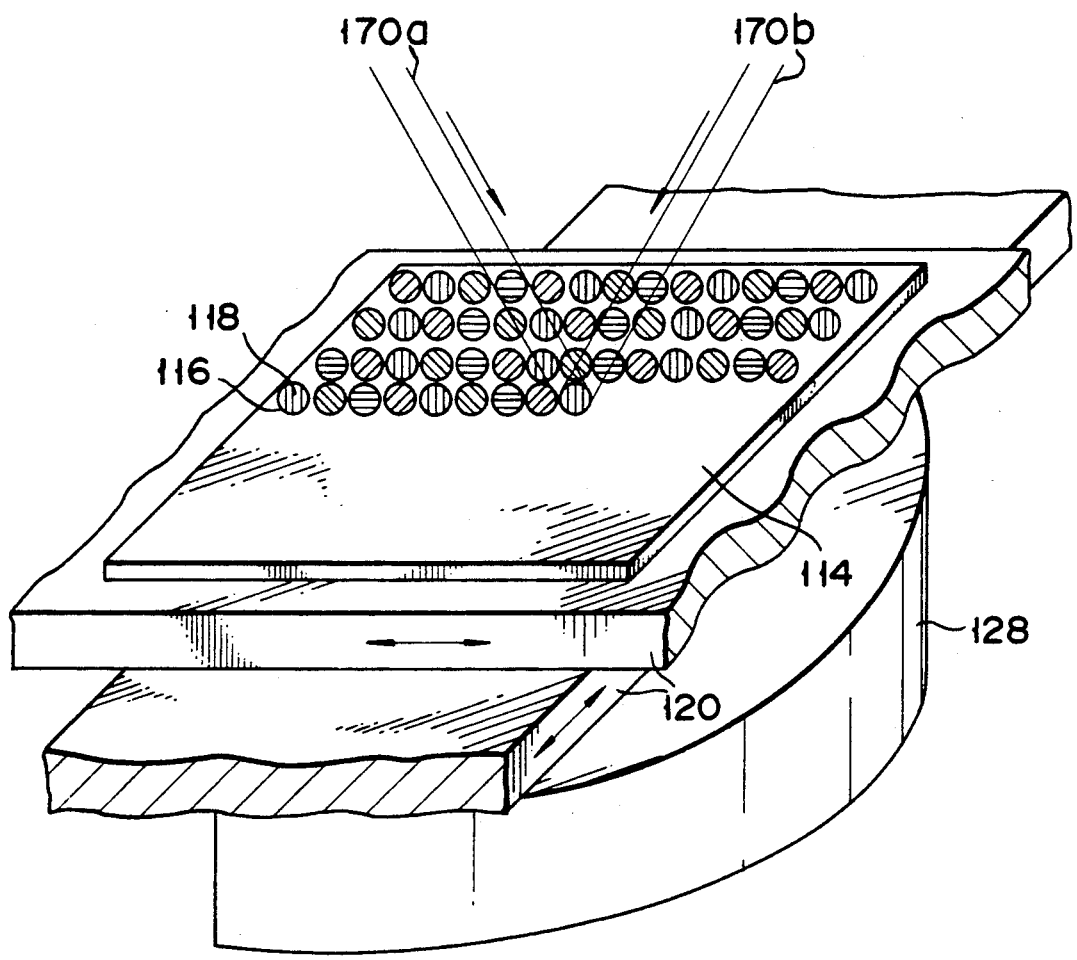
FIG. 7 is a view for explaining a method of forming dot-like diffraction gratings by a two-beam interference method used in the second embodiment of the present invention.

FIG. 7 is a perspective view for explaining a method of manufacturing a display having diffraction grating patterns by interference of two laser beams More specifically, as shown in FIG. 7, when two laser beams 170a and 170b are caused to interfere with each other on a dryplate 114, interference fringes 118 are formed on a dot 116. The cycle of the interference fringes 118 can be changed by changing the angle at which the two laser beams 170a and 170b interfere with each other. Dots 116 each consisting of the interference fringes 118 are formed on the dryplate 114 while an X-Y stage 120 and a rotary (θ) stage 128 are moved in accordance with commands from a computer. In this case, in order to form three types of dots 116 representing three colors, i.e., red (R), green (G), and blue (B), laser beams of three angles are prepared. In this manner, three color spots of red (R), green (G), and blue (G) are formed at arbitrary positions on the dryplate 114 in accordance with commands from the computer. The disclosure of aforementioned U.S. Ser. No. 276,469 is incorporated as a reference to determine the angles of laser beam.

Figure 8:
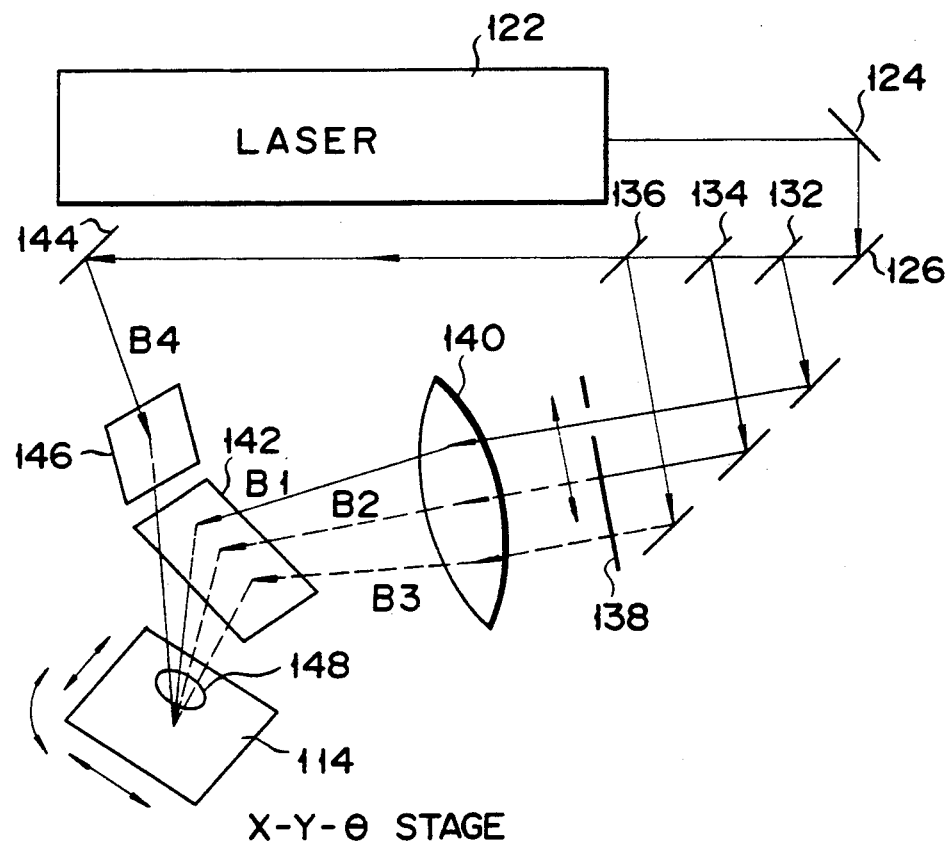
FIG. 8 is a view showing an arrangement of an optical system for executing the two-beam interference method.

FIG. 8 shows an optical system for forming dots on a dryplate. Referring to FIG. 8, the optical path of a laser beam emitted from a laser 122 is changed by total reflection mirrors 124 and 126. The laser beam is then incident on half mirrors 132, 134, and 136 so as to be divided into four laser beams B1, B2, B3, and B4. At this time, the four laser beams B1, B2, B3, and B4 are set to have the same intensity. One of the three laser beams B1, B2, and B3 is selected by a slit 138 and is radiated on the dryplate 114 through lenses 140 and 142. In addition, the laser beam B4 a reference light is incident on the dryplate 114 through mirrors 144 and 146. In this case, the four laser beams B1, B2, B3, and B4 are adjusted to be concentrated at a point. In addition, the angles at which these four laser beams B1, B2, B3, and B4 are incident on the dryplate 114 are set to values calculated in advance so as to allow diffracted beams from diffraction gratings to respectively represent red (R), green (G), and blue (B).

The dryplate 114 is placed on the X-Y stage 120. The X-Y stage 120 is mounted on the θ stage 128. These stages (X-Y-θ stage) can be moved under the control of the computer. In addition, an exposure or non-exposure operation using the four laser beams B1, B2, B3, and B4 is controlled by opening/closing of a shutter 148 arranged in front of the dryplate 114.

Figure 9:
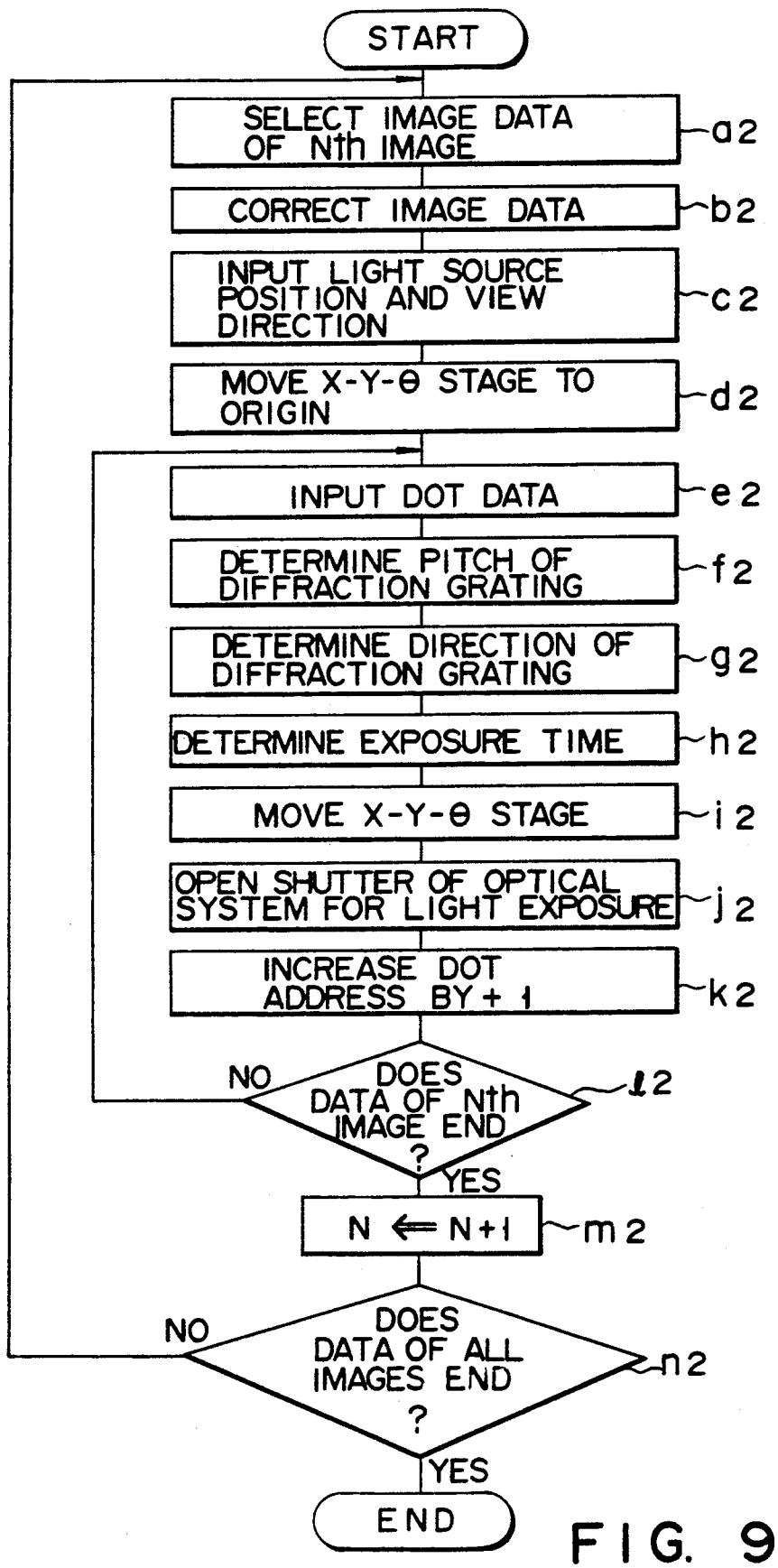
FIG. 9 is a flow chart for explaining a manufacturing method according to the second embodiment of the present invention.

A method of manufacturing a display having diffraction grating patterns according to the second embodiment will be described below with reference to FIG. 9.

In step a2, an Nth two-dimensional image of an object to be three-dimensionally displayed is photographed by a TV camera, and image data of the two-dimensional image is read and input to the computer. Alternatively, image data of computer graphics may be input to the computer. In addition, after all the required two-dimensional images of an object to be three-dimensionally displayed are photographed at a plurality of photographing positions and are input to the computer, an Nth two-dimensional image may be selected from the data of the plurality of two-dimensional images.

In step b2, the two-dimensional image is corrected in the computer. This is because a two-dimensional image input to the computer often requires correction for, e.g., distortion and contrast.

In step c2, a light source position and a view direction in observation of the display of the present invention are input to the computer.

In step d2, the X-Y stage is moved to the origin. In step e2, corresponding dot data is input from a data file to the computer. Of the image data of the corrected two-dimensional image, this dot data is associated with the position, color, and brightness of the above-mentioned dot, and the direction of the dot with respect to the panorama parallax object assumed when the two-dimensional image including the dot is fetched.

Subsequently, in steps f2, g2, and h2, the pitch and direction of a diffraction grating and an exposure time are determined on the basis of these data and the light source position and the view direction input in step c2. The direction of the diffraction grating are obtained by using the above-mentioned equations. When, angle α of a 1st-order diffracted light is small, the pitch of the diffraction gratings depends on only a reproduced light color. Therefore the pitch corresponding to the color of the dot is selected from the pitches of the R, G and B.

U.S. Pat. No. 5,058,092 is incorporated as a reference. The exposure time can be set in accordance with a time during which the shutter of the exposure unit in FIG. 8 is opened. The exposure time is set to be proportional to the brightness of a portion of the object which corresponds to the dot. Note that the order of steps f2, 2, and h2 is not limited to the above order but may be variously changed.

In step i2, the X-Y stage and θ-stage (X-Y-θ stage) are moved to the position of the dot to be exposed on the basis of the dot data input in step e2. In step j2, exposure of a diffraction grating for the dot is performed by using the two-beam interference unit shown in FIG. 8. With this series of steps, formation of the grating corresponding to one dot is completed.

Subsequently, in step k2, the address of the data file is incremented by one in order to refer to the data of the next dot. If it is determined in step l2 that image data corresponding to this address is present, the flow returns to step e2 to input the data of another dot, and steps f2, g2, h2, i2, j2, and k2 are repeated. This series of steps is continued until all the image data corresponding to the dots of the Nth twodimensional image are processed. With this processing, formation of a diffraction grating pattern based on the image data of the Nth two-dimensional image is completed.

If it is determined in step l2 that the formation of the Nth two-dimensional image is completed, the flow advances to step m2 to refer to an (N+1)th two-dimensional image. If it is determined in step n2 that the (N+1)th two-dimensional image is present, the flow returns to step a2, and steps a2 to l2 are executed. With this processing, diffraction grating patterns corresponding to the (N+1)th two-dimensional image are formed.

If the loop consisting of steps a2 to n2 is executed in this manner and it is determined in step n2 that no further three-dimensional image is present, formation of all the diffraction gratings is completed.

The dryplate having the diffraction grating patterns formed in this manner is used as a master plate for duplication. Duplication is performed by a well known embossing method.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of manufacturing a display having diffraction grating patterns, comprising the steps of:
   (a) obtaining a plurality of two-dimensional images by observing an object at a plurality of positions, and inputting images of the plurality of two-dimensional images to a computer;
   (b) selecting nth image data from the plurality of image data;
   (c) inputting data of a reproducing light source position and a view direction;
   (d) inputting predetermined dot data of the nth image data;
   (e) determining a pitch d and a direction $\Omega$ of a diffraction grating and an area of a dot on the basis of the data of the reproducing light source position and the view direction and the dot data, wherein the pitch $\underline{d}$ and a direction $\Omega$ are obtained according to the following equations:

$$\tan(\Omega) = \sin(\alpha)/\sin(\theta)$$

$$d = \lambda/\sqrt{\sin^2(\theta) - \sin^2(\alpha)}$$

where $\theta$ is the incidence angle of illumination light, $\alpha$ is the direction of 1st-order diffracted light, and $\lambda$ is the wavelength of the 1-st order diffracted light;
   (f) moving an X-Y stage to a predetermined position on the basis of the dot data and delineating the grating by using an electron scanning unit;
   (g) sequentially incrementing an address of the dot data and repeating the steps (d) to (f) until all data corresponding to the nth image data are processed; and
   (h) selecting another image data, and repeating the steps (b) to (g) until all image data are processed.

2. A method of manufacturing a display having diffraction grating patterns by using a two-beam interference method, comprising the steps of:
   (a) obtaining a plurality of two-dimensional images by observing an object at a plurality of positions, and inputting images of the plurality of two-dimensional images to a computer;
   (b) selecting nth image data from the plurality of image data;
   (c) inputting data of a reproducing light source position and a view direction;
   (d) inputting predetermined dot data of the nth image data;
   (e) determining a pitch and a direction $\Omega$ of a diffraction grating an an exposure time on the basis of the data of the reproducing light source position and the view direction and the dot data, wherein the direction $\Omega$ of the diffraction grating is obtained according to the following equation:

$$\tan(\Omega) = \sin(\alpha)/\sin(\theta)$$

wherein $\theta$ is the incidence angle of illumination light, $\alpha$ is the direction of 1st-order diffracted light, and $\lambda$ is the wavelength of the 1-st order diffracted light;
   (f) moving an X-Y-θ stage to a predetermined position on the basis of the dot data and forming the grating by using the two-beam interference method;
   (g) sequentially incrementing an address of the dot data and repeating the steps (d) and (f) until all data corresponding to the nth image data are processed; and
   (h) selecting another image data, and repeating the steps (b) to (g) until all image data are processed.

* * * * *